United States Patent [19]

Alexander, III et al.

[11] Patent Number: 5,794,243

[45] Date of Patent: Aug. 11, 1998

[54] METHOD AND APPARATUS FOR EXECUTING A BINARY SEARCH IN A DATA CACHE

[75] Inventors: William Preston Alexander, III; Geoffrey Owen Blandy; Robert J. Urquhart, all of Austin, Tex.

[73] Assignee: International Business Machines Corporation, Armonk, N.Y.

[21] Appl. No.: 570,041

[22] Filed: Dec. 11, 1995

[51] Int. Cl.⁶ .................................................. G06F 17/30
[52] U.S. Cl. .................. 707/100; 707/205; 711/100; 711/118; 711/122; 711/120; 711/143
[58] Field of Search .......................... 395/600, 611, 395/603, 613, 400; 707/100, 205; 711/100, 118, 122, 120, 143

[56] References Cited

U.S. PATENT DOCUMENTS

| | | | |
|---|---|---|---|
| 4,860,201 | 8/1989 | Stolfo et al. | |
| 5,155,832 | 10/1992 | Hunt | 395/425 |
| 5,241,638 | 8/1993 | Mork et al. | 395/400 |
| 5,263,160 | 11/1993 | Porter, Jr. et al. | |
| 5,280,613 | 1/1994 | Chan et al. | 395/700 |
| 5,305,389 | 4/1994 | Palmer | |
| 5,359,723 | 10/1994 | Mathews et al. | 395/425 |
| 5,396,604 | 3/1995 | Delano et al. | 395/375 |
| 5,404,510 | 4/1995 | Smith et al. | |
| 5,513,344 | 4/1996 | Nakamura | 395/185.18 |
| 5,537,573 | 7/1996 | Ware et al. | 395/464 |
| 5,548,742 | 8/1996 | Wang et al. | 395/455 |
| 5,563,987 | 10/1996 | Scott | 395/115 |
| 5,577,227 | 11/1996 | Finnell et al. | 395/449 |
| 5,586,297 | 12/1996 | Bryg et al. | 395/470 |
| 5,590,307 | 12/1996 | McClure | 395/485 |

*Primary Examiner*—Paul R. Lintz
*Assistant Examiner*—Jean M. Corrielus
*Attorney, Agent, or Firm*—David A. Mims, Jr.

[57] ABSTRACT

Minimizing data cache misses when performing binary searches. Values in an array to be searched are stored as subsets, clustered to minimize the number of cache misses. A first set of auxiliary values is created consisting of a subset of the first-searched values that fit on one cache line. Subsequent sets of values are then created consisting of one cache line full of values for each value in the first set within one cache line. A binary search is conducted by first searching SET ONE, for the largest array value that is less-than or equal to the search key, or alternatively the smallest array value greater than or equal to the search key. The search of SET ONE, is followed by a search of any subsequent sets of values, with the binary search concluding by testing values within one cache line in the subsequent sets of values until the desired value is found.

10 Claims, 3 Drawing Sheets

METHOD AND APPARATUS FOR EXECUTING A BINARY SEARCH IN A DATA CACHE

FIELD OF THE INVENTION

The present invention relates to data processing systems, and more particularly, to providing a high performance binary search technique for minimizing data cache misses.

BACKGROUND OF THE INVENTION

There is a continuing goal of increasing the performance of computer systems through the use of more powerful microprocessors and increased memory speeds. In order to achieve that goal, some high performance computer systems typically utilize cache memories interposed between a microprocessor and slower main memories. The cache memories may operate at speeds 20–40 times faster then the main memories. Access to the main memory is preferably through the cache memory, so that the microprocessor obtains instructions and data from the cache memory. The advantage of cache memories lies in the fact that statistically, computer programs tend to access the same group of memory locations on a repetitive basis, so that once the instructions/data is in the cache memory, the microprocessor obtains the data from the relatively fast cache memory, rather than the slower main system memory. During read cycles, data and instructions are fetched from the cache memory if they are currently stored in cache memory (e.g., referred to as a cache hit). When the data and instructions are not currently in cache memory (e.g., a cache miss), they are retrieved from the main memory, stored in the cache memory, and provided to the microprocessor. In a similar manner, during write cycles, data is written into cache memory if currently stored in cache memory (e.g., Write cache hit). Otherwise, data is either not written into the cache memory (Write cache miss), or written into the cache memory after forcing a cache line update (e.g., Write allocate). Data is written into the main memory either immediately (Write-through), or when a cache line is reallocated (Write-back). Some computer systems have increased performance by utilizing a main memory and a secondary memory which is provided with a cache memory hierarchy, having a first level write through-cache memory, and a second level write-back cache memory. The first level Write-through cache memory, caches data/instructions of the main and secondary memory, and the second level write-back cache memory caches data of the main memory. The first level Write-through cache memory is optimized to provide a high cache read rate for cache read cycles performed by the CPU, and the second level Write-back cache memory is optimized to complement the first level Write-through cache memory. The first level Write-through cache memory is designed to be responsive to Read and Write cycles performed by the CPU. The first level Write-through cache memory is designed to reallocate its cache lines in response to read misses, but not Write misses. The second level Write-back cache memory is designed to be responsive to READ and Write cycles performed by the CPU and other direct memory accessing devices. The second level Write-back cache memory, is designed to reallocate its cache lines for Write misses, from Write cycles performed by the CPU, and not Read misses from Read cycles. The second level Write-back cache memory is provided with cache lines having line sizes greater than or equal to the line size of the cache lines of the first level Write-through cache memory. The second level Write-back cache memory is kept small as compared to the first level Write-through cache memory. While increasing performance, this technique is still plagued by data cache misses when performing binary searches. Data cache misses are an important factor in the performance of binary search procedures. The performance of computer is increasingly limited by the number of data cache misses that occur, rather than the number of instructions executed, as the disparity between processor speed and memory speed continues to increase.

It is therefore desirable to have a method and apparatus for minimizing cache misses while performing binary searches.

SUMMARY OF THE INVENTION

This invention relates to a method and apparatus for minimizing data cache misses when performing binary searches. Values to be searched are not stored in the main memory in a sorted order. Instead, the values to be searched are stored as subsets, clustered such that the number of cache misses are minimized. A first set of auxiliary values is created consisting of a subset of the first-searched values that fit on one cache line. For example, an array of 512 data values will have a first set, SET ONE, which is one cache line long, and for an 8 word set, contains the 0-th, 64-th, 128-th . . . . , 448-th values from the data array. A subsequent set, SET TWO, of values is then created consisting of one cache line full of values for each value in the first set within one cache line. SET TWO, has 8 cache lines, and for a set of 64 words, contains the values in the original array whose indices are 0, 8, 16, . . . 8*N, . . . 504. A binary search is carried out by first searching SET ONE, for the largest array value that is less-than or equal to the search key. The search of SET ONE is followed by a search of the subsequent set of values, SET TWO. The binary search concludes by testing values within one cache line in SET TWO until the desired value is found. The binary search of the invention causes three cache misses compared to a minimum of six cache misses using traditional binary search techniques.

DETAILED DESCRIPTION OF THE EMBODIMENTS

Figure 1:
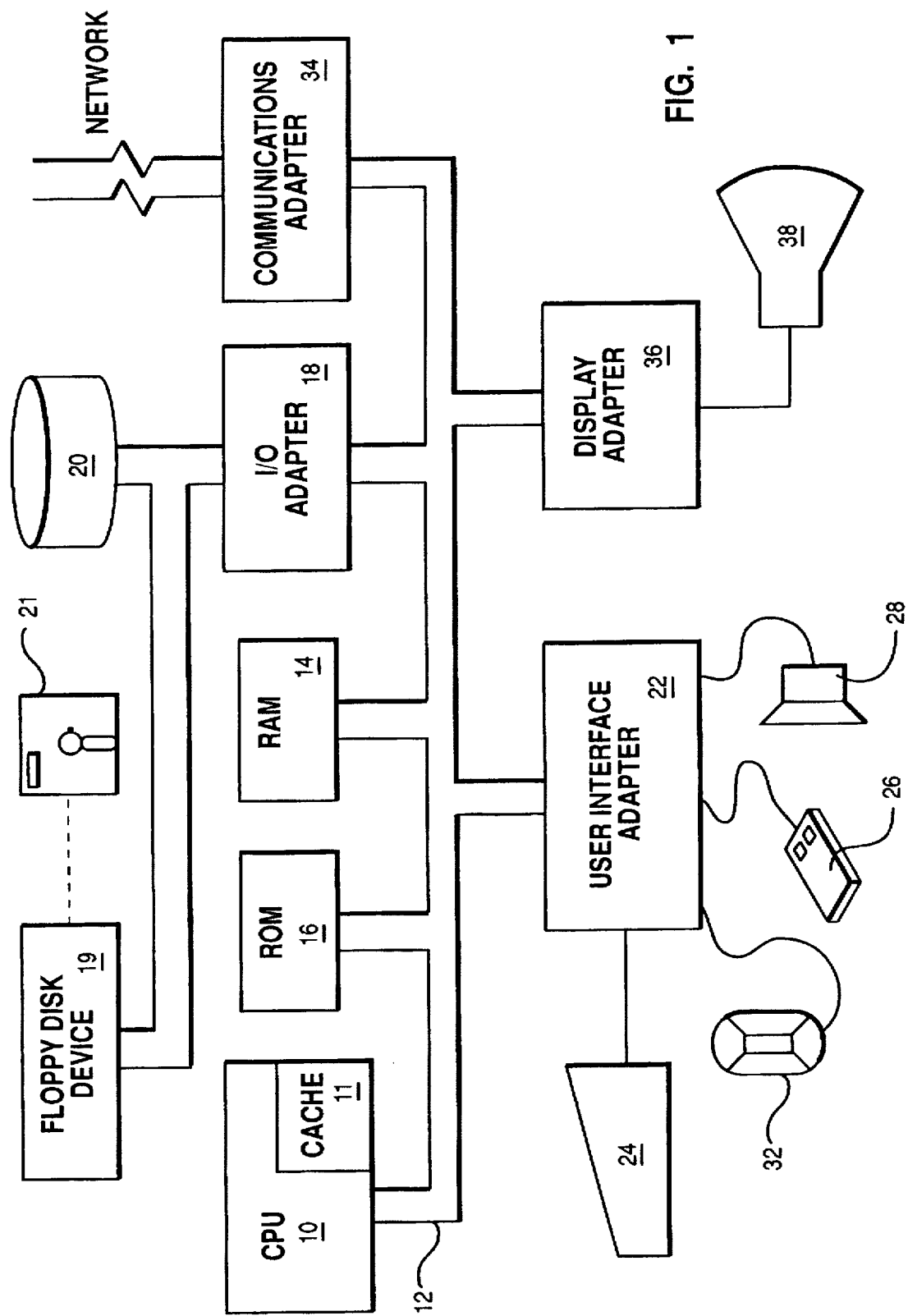
FIG. 1 is a block diagram representation of a computer/workstation where the invention may be practiced.

This invention provides a method and apparatus for minimizing misses, while performing binary searches in a data processing system. The invention is preferably practiced in the context of an operating system resident on an IBM PS/2 computer, available from the IBM Corporation. A representative hardware environment is depicted in Figure 1, which illustrates a typical hardware configuration of a workstation in accordance with the subject invention having a central processing unit 10, such as a conventional microprocessor having an on-chip data cache 11, and a number of other units interconnected via a system bus 12. The workstation shown in FIG. 1 includes main memory such as Random Access Memory (RAM) 14, Read Only Memory (ROM) 16, an I/O adapter 18, for connecting peripheral devices such as disk unit 20, and floppy disk device 19, to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36, for connecting the bus to a display device 38. One skilled in the art will appreciate that the procedures of this invention may be in the form of a computer program product on a computer readable medium, which may be temporarily or permanently loaded on the workstation in disk storage 20, floppy diskette 21, or main memory 14.

Figure 2:
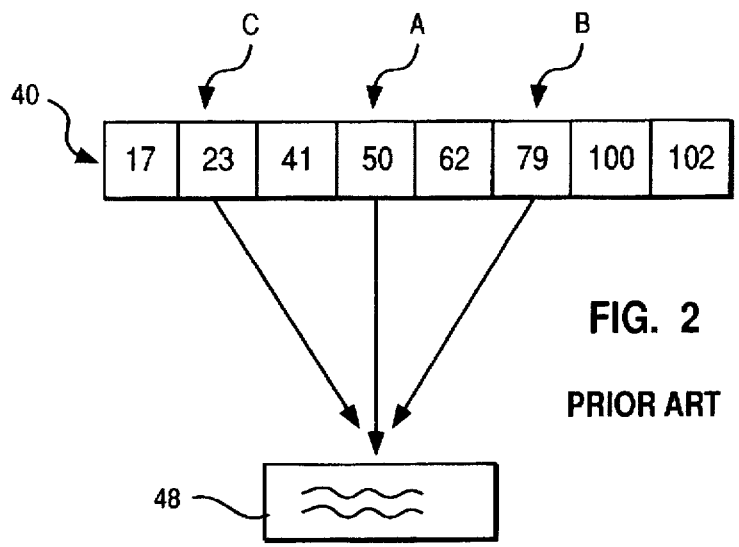
FIG. 2 is a prior art example of loading a cache memory in a traditional binary search.

With reference to FIG. 2, a block diagram is shown for performing a traditional binary search. In the conventional binary search, the values to be searched are stored in main memory 40, in sorted order. The cache 48, is loaded with the appropriate values from the main memory 40, when a particular value is accessed. The technique for searching for a value in main memory, consists of testing the middle value "A", followed by either the value one-fourth of the way from the start "C" of the array, or the value "B" one-fourth of the way from the end of the array. In the conventional binary search, assuming the data cache is cold (e.g., there are no values left in the cache from a previous search) when a search begins, the number of comparisons is approximately log2(N)(e.g, logarithm to the base 2 of N). The number of data cache misses is approximately log2 (N) –log2 (DCL). This is because until the search step is reduced to the DCL size, each reference will cause a miss. After that, the references are within an already touched line. As used in this invention, the data cache line (DCL) is the number of data values that fit in one line of a Level 1 (L1) data cache. The illustrative numbers in this specification assume 4-byte data values. The present invention recognizes that the values to be searched can be stored as subsets of the original array, clustered in such a way that the number of cache misses are minimized. This is accomplished by creating auxiliary sets consisting of a subset where the first-searched values fit in one cache line. A second set is then created consisting of one cache line full of values for each value in the first set. Using this invention, there is at most one miss per "level" where the number of levels is the ceiling of (log2(N)/log2(DCL)). A illustration showing the relative number of cache misses for different values of N, assuming data cache line size (DCL) equals 8, is shown in Table A.

TABLE A

|  | CACHE MISSES | |
| --- | --- | --- |
| "N" | TRADITIONAL | THIS INVENTION |
| 512 | 6 | 3 |
| 256K | 15 | 6 |
| 2048K | 18 | 7 |
| 2**(3M) | 3M–3 | M |

Figure 3:
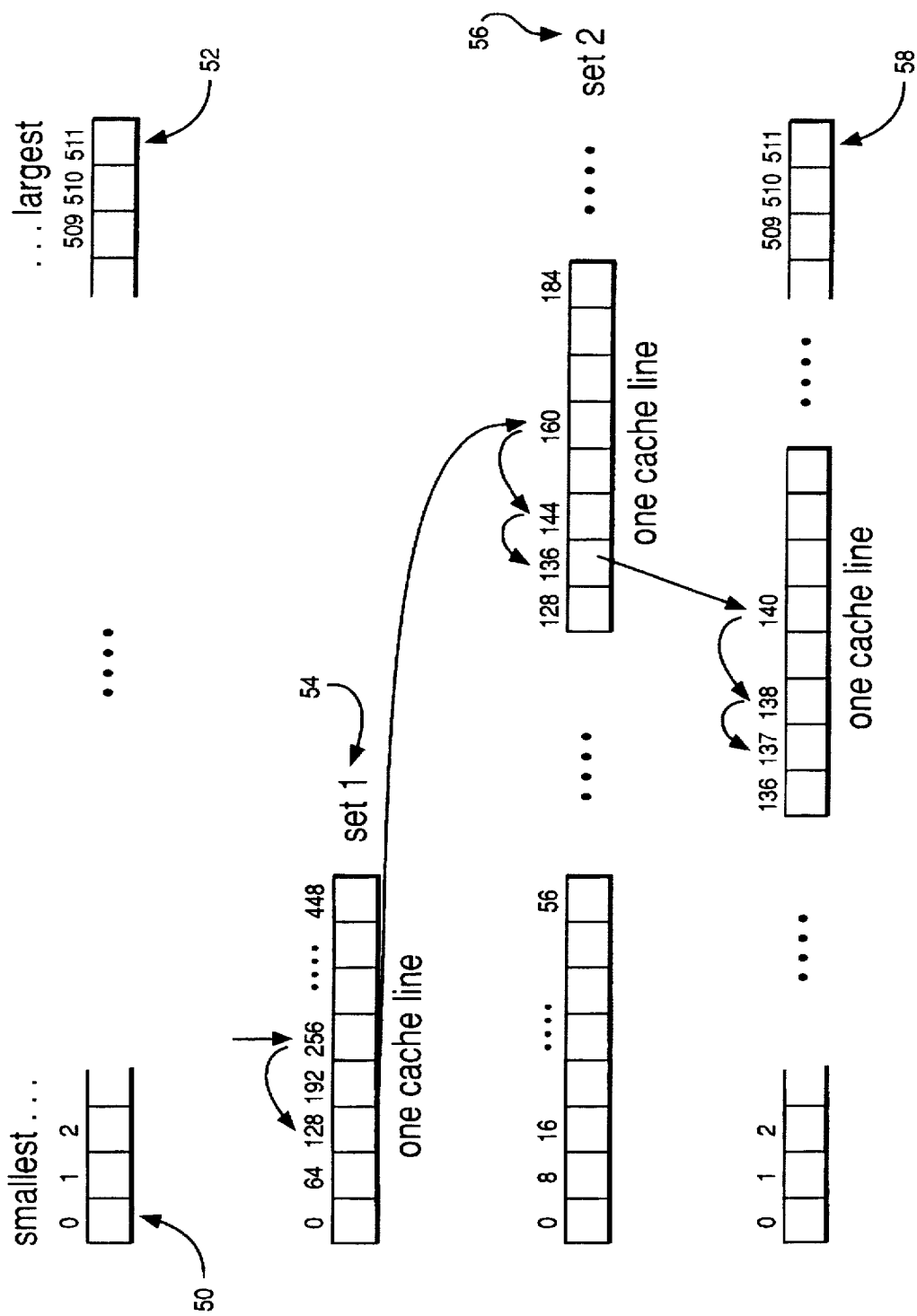
FIG. 3 is an example of a binary search using the invention.

Turning to FIG. 3, an example binary search will be described for sorting a 512 element array using the present invention. In the traditional binary search, the values to be searched are stored in sorted order from the smallest element 50, to the largest element 52. This invention stores subsets of the original array elements (approximately log2 (N) /log2 (DCL) clustered in such a way, that the number of caches misses is minimized. Since the first value tested in any binary search is always the middle value, followed by either the value one-fourth of the way from the start of the array, or the value one-fourth of the way from the end of the array, the invention creates an auxiliary set 54, consisting of a subset of these first-searched values. This example uses an array of 512 items (log2(N)=9, a data cache line size (DCL) equals 8 (log2(8)=3, and a target index of 137. SET ONE 54, of the auxiliary data structure is one cache line long. Its eight words contain the 0-th, 64-th, 128-th, . . . . 448-th values from the data array. SET TWO 56, has eight cache lines. The 64 words of SET TWO 56, contain the values in the original array whose indices are: 0, 8, 16, . . . 8 N, . . . 504. Generally, the binary search is carried out by first searching SET ONE 54, followed by a search of SET TWO 56, where the search terminates in SET TWO by searching within one cache line of the original array. More specifically, searching begins in SET ONE 54, for the largest array value that is less than or equal to the search key. In this example, the search of SET ONE 54, finds the third entry which represents the 128-th value in the original array. The 128-th value directs the search to the third cache line in SET TWO 56, which contains the array values whose indexes are 128, 136, . . . 184. A search of these eight values finds the second value which is the 136-th value in the original array. This in turn directs the procedure to the 18-th((3-1) (2**3)+2) cache line of the original data array, which contains the values whose indexes are 136–143. The binary search concludes by testing values within this one cache line until the 137-th element 58, is found. As can be seen, there will be exactly three cache misses in this case, or one for each set. One skilled in the art appreciates that this example is valid when log2(N) is divisible by log2 (DCL), where the values of "N" and "DCL" are arbitrarily selected. There are a number of alternatives when this is not true, without changing the fundamental goal of minimizing the data cache misses. One alternative assumes a larger value of N, such that it is true. For example, if N=65 and DCL=8, then N becomes 512. The effect is that some of the SET ONE values will be undefined. The undefined values in SET ONE are set to a maximum value, so that they can never be selected by the binary search. In general, at most one cache line at each level is partially defined. That cache line's undefined values are set to the maximum value to insure that they are not selected.

Figure 4:
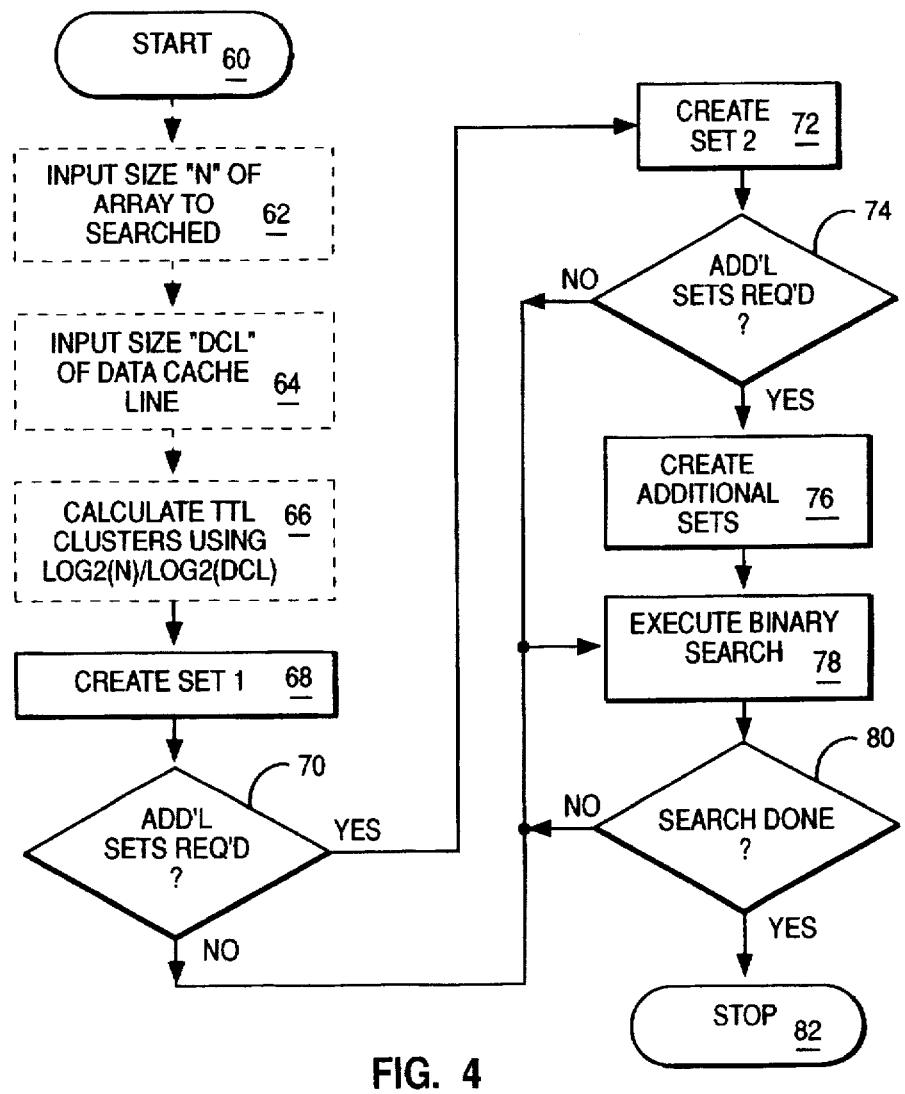
FIG. 4 is a flow diagram of a procedure for executing a binary search using the present invention.

Referring now to FIG. 4, there is flow diagram for searching for a value using the invention. The procedure begins at block 60, and proceeds immediately to block 62, where the size "Nu" of the array is inputted. At block 64, the size "DCL" of the data cache line is inputted. The array size "N" and the data cache line size "DCL" are used in block 66, to calculate the total number of sets/clusters that must be created. At block 68, the first subset, SET ONE is created consisting of a subset of the first-searched values that fit in one cache line. A check is conducted at block 70, to determine if additional sets/clustered must be created. If NO, the procedure branches to block 78 where the binary search is executed. If YES, at block 72, the second subset, SET TWO, is created. This is followed at block 74, by a check to determine if additional sets are required. If YES, at block 76, the additional sets are created. If NO, the procedure branches to block 78, where the binary search is executed. At block 80, if the value is found or it has been determined that it is not present, the procedure stops at block 82. Else, the procedure returns to block 78, where the binary search is continued.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A method, implemented in a computer system, for executing a binary search in a data cache for a value in a random ordered array in main memory of said computer, wherein said main memory is connected to a data cache, comprising the steps of:

creating a first set of values for said random ordered array as a subset of first-search values on one cache line of said data cache;

calculating a total cluster size for said random ordered array based on said array size and said data cache line size;

creating subsequent sets of values of said random ordered array of one cache line full of values for each value of said first set of values;

performing a binary search for a search key in said data cache.

2. The method of claim 1, wherein the step of performing a binary search further comprises:

searching said first set for said search key; and searching for said search key in said subsequent sets of values when said search key is not found in said first set.

3. The method of claim 2, further comprising:

searching said first set for the largest array value less than or equal to said search key; and searching for said search key in said subsequent sets of values based on the largest array value found in said first set.

4. The method of claim 2, further comprising:

searching said first set for the smallest array value greater than or equal to said search key; and searching for said search key in said subsequent sets of values based on the smallest array value found in said first set.

5. An apparatus for executing a binary search in a data cache for a value in a random ordered array in main memory of said computer, where said main memory is connected to a data cache, comprising:

means for creating a first set of values for said random ordered array as a subset of first-search values on one cache line of said data cache;

means for calculating a total cluster size for said random ordered array based on said array size and said data cache line size;

means for creating subsequent sets of values of said random ordered array of one cache line full of values for each value of said first set of values; and means for performing a binary search for a search key in said data cache.

6. The apparatus of claim 5, wherein the means for performing a binary search further comprises:

means for searching said first set for said search key; and means for searching for said search key in said subsequent sets of values when said search key is not found in said first set.

7. The apparatus of claim 6, further comprising:

means for searching said first set for the largest array value less than or equal to said search key; and means for searching for said search key in said subsequent sets of values based on the largest array value found in said first set.

8. The apparatus of claim 6, further comprising:

means for searching said first set for the smallest array value greater than or equal to said search key; and means for searching for said search key in said subsequent sets of values based on the smallest array value found in said first set.

9. A computer program product having a computer readable medium having computer program logic recorded thereon for executing a binary search in a data cache for a value in a random ordered array in main memory of said computer, wherein said main memory is connected to a data cache, comprising:

computer readable means for creating a first set of values for said random ordered array as a subset of first-search values on one cache line of said data cache;

computer readable means for calculating a total cluster size for said random ordered array based on said array size and said data cache line size;

computer readable means for creating subsequent sets of values of said random ordered array of one cache line full of values for each value of said first set of values;

computer readable means for performing a binary search for a search key in said data cache.

10. The computer program of claim 9, comprising:

computer readable means for searching said first set for an array value equal to said search key; and computer readable means for searching for said search key in said subsequent sets of values when said array value is not found in said first set.

* * * * *